United States Patent
Chu et al.

(10) Patent No.: US 10,976,745 B2
(45) Date of Patent: Apr. 13, 2021

(54) SYSTEMS AND METHODS FOR AUTONOMOUS VEHICLE PATH FOLLOWER CORRECTION

(71) Applicant: GM GLOBAL TECHNOLOGY OPERATIONS LLC, Detroit, MI (US)

(72) Inventors: Kevin Chu, San Mateo, CA (US); Sohrab Haghighat, Emeryville, CA (US); Brooks Reed, San Francisco, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 479 days.

(21) Appl. No.: 15/892,911

(22) Filed: Feb. 9, 2018

(65) Prior Publication Data

US 2018/0164827 A1   Jun. 14, 2018

(51) Int. Cl.
*G05D 1/02* (2020.01)
*G05D 1/00* (2006.01)
(Continued)

(52) U.S. Cl.
CPC ........ *G05D 1/0223* (2013.01); *G01C 21/3415* (2013.01); *G01C 21/3446* (2013.01);
(Continued)

(58) Field of Classification Search
CPC ......... B60W 2550/00; B60W 2550/10; B60W 2550/14; B60W 2550/146; B60W 2550/20; B60W 2550/22; B60W 2550/30; B60W 2550/40; B60W 2550/402; B60W 2550/406; B60W 2550/408; B60W 40/00; B60W 40/10; B60W 40/105; B60W 40/109; B60W 2050/00; B60W 2050/0001; B60W 2050/0013; B60W 2050/04; B60W 2050/0016; B60W 2050/0026; B60W 2050/0043; B60W 2050/0075; B60W 2050/0097; B60W 2510/06; B60W 2510/0638; B60W 2510/0642; B60W 2510/0652; B60W 10/04; B60W 10/06; B60W 10/08; B60W 10/10; B60W 10/22; B60W 10/24; B60W 10/30; B60W 20/00; B60W 20/11; B60W 20/12; B60W 30/02; B60W 30/08; B60W 30/10; B60W 30/16; B60W 30/18; B60W 30/18009; B60W 30/188; B60W 30/1882; B60W 30/192; F02N 11/00; F02N 11/04; F02N 11/06; F02N 11/08; F02N 11/0818; F02N 11/0829; F02N 11/0833; F02N 11/0851; F02N 11/0859; F02N 11/087; G01S 19/43; B62D 15/025; G05D 2201/0213; G05D 2201/0201; G05D 1/027; G05D 1/0223;
(Continued)

(56) References Cited

U.S. PATENT DOCUMENTS 7,835,832 B2 * 11/2010 MacDonald ............ G01S 19/03
  701/24

* cited by examiner

*Primary Examiner* — Anthony R Jimenez
(74) *Attorney, Agent, or Firm* — Lorenz & Kopf, LLP

(57) ABSTRACT

Systems and methods are provided for generating a vehicle path to operate an autonomous vehicle. A method includes using a lateral re-entry planner system to correct for a lateral reentry error. A longitudinal re-entry planner system is used to correct a longitudinal reentry error. Path correction commands are generated based upon the corrections provided by the lateral re-entry planner system and the longitudinal re-entry planner system.

17 Claims, 15 Drawing Sheets

(51) Int. Cl.
*G01C 21/34* (2006.01)
*G08G 1/00* (2006.01)

(52) U.S. Cl.
CPC ......... *G05D 1/0088* (2013.01); *G05D 1/0217* (2013.01); *G05D 1/0248* (2013.01); *G05D 1/0274* (2013.01); *G08G 1/202* (2013.01); *G05D 2201/0213* (2013.01)

(58) Field of Classification Search
CPC .. G05D 1/0088; G05D 1/0217; G05D 1/0248; G05D 1/0274; G05D 1/02; G05D 1/0278; G05D 1/0231; G05D 1/0253; G05D 1/0272; G08G 1/202; G01C 21/3415; G01C 21/3446
USPC .......................................................... 701/26
See application file for complete search history.

SYSTEMS AND METHODS FOR AUTONOMOUS VEHICLE PATH FOLLOWER CORRECTION

TECHNICAL FIELD

The present disclosure generally relates to autonomous vehicles, and more particularly relates to systems and methods for vehicle path follower correction in an autonomous vehicle.

Introduction

An autonomous vehicle is a vehicle that is capable of sensing its environment and navigating with little or no user input. An autonomous vehicle senses its environment using sensing devices such as radar, lidar, image sensors, and the like. The autonomous vehicle system further uses information from global positioning systems (GPS) technology, navigation systems, vehicle-to-vehicle communication, vehicle-to-infrastructure technology, and/or drive-by-wire systems to navigate the vehicle.

Vehicle automation has been categorized into numerical levels ranging from Zero, corresponding to no automation with full human control, to Five, corresponding to full automation with no human control. Various automated driver-assistance systems, such as cruise control, adaptive cruise control, and parking assistance systems correspond to lower automation levels, while true "driverless" vehicles correspond to higher automation levels.

Trajectory planning is used for automated driving and can be reactive to changes to dynamic objects on the roads. A calculated trajectory should follow the rules of traffic, be safe within the road boundaries, satisfy dynamic constraints, etc. Existing motion planning algorithms, however, are either computationally intensive or not designed for multiple different possible scenarios for urban and highway driving.

Accordingly, it is desirable to provide systems and methods that can more efficiently speed up the processing of motion planning for automated driving. Furthermore, other desirable features and characteristics of the present invention will become apparent from the subsequent detailed description and the appended claims, taken in conjunction with the accompanying drawings and the foregoing technical field and background.

SUMMARY

Systems and methods are provided for generating a vehicle path to operate an autonomous vehicle. In one embodiment, a system and method include a lateral re-entry planner system that is used to correct for a lateral reentry error. A longitudinal re-entry planner system is used to correct a longitudinal reentry error. Path correction commands are generated based upon the corrections provided by the lateral re-entry planner system and the longitudinal re-entry planner system.

In other embodiments, a system and method include receiving, by one or more processors, data indicative of a vehicle path and data indicative of an initial position from a localization system for determining a lateral reentry error and a longitudinal reentry error. A lateral re-entry planner system is used for determining a trajectory related to curvature and heading for following the path based upon the lateral reentry error. A longitudinal re-entry planner system is used for determining trajectory related to acceleration, velocity, and travel for following the vehicle path based the longitudinal reentry error. Path correction commands are generated based upon the determined trajectory of the lateral re-entry planner system and the determined trajectory of the longitudinal re-entry planner system. The generated path correction commands are transmitted for controlling the autonomous vehicle.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware (e.g., one or more data processors), software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, machine learning, image analysis, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
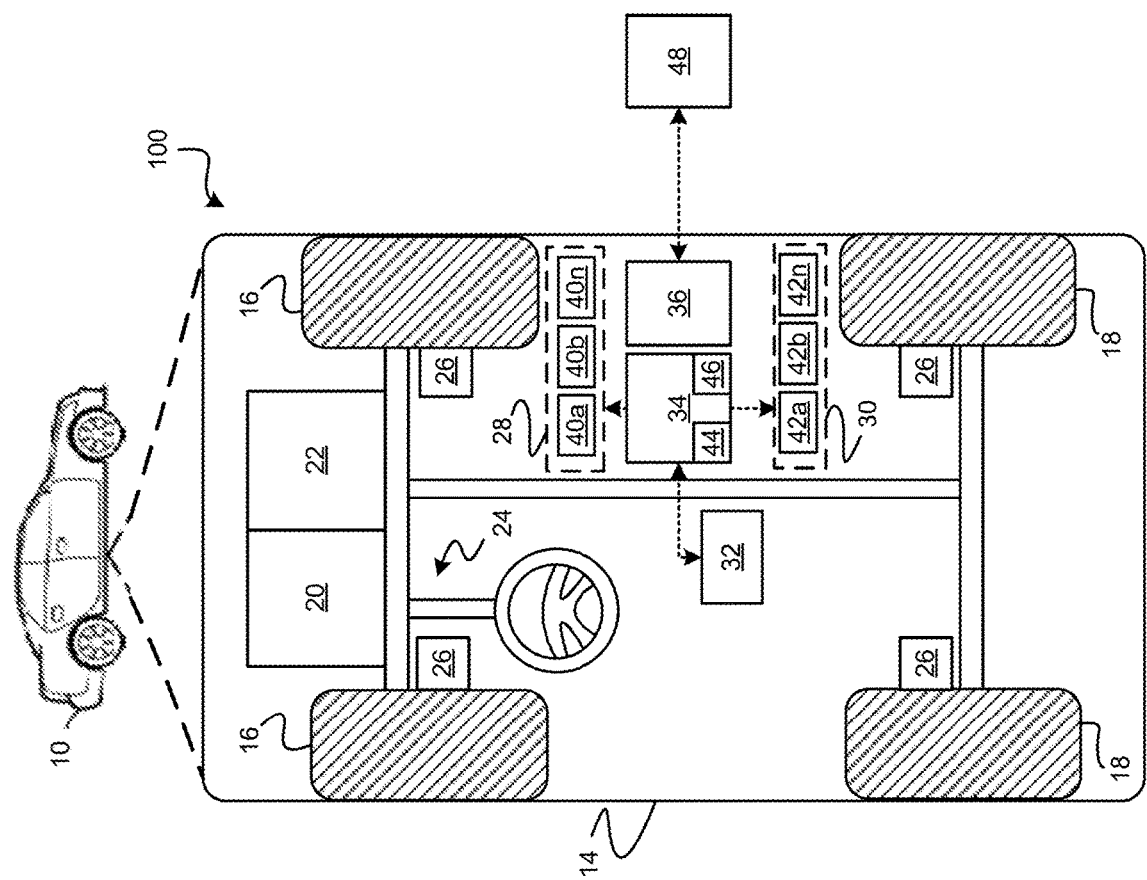
FIG. 1 is a functional block diagram illustrating an autonomous vehicle, in accordance with various embodiments.

With reference to FIG. 1, a system for performing autonomous vehicle path control shown generally at 100 is associated with a vehicle 10 in accordance with various embodiments. In general, the system 100 optimizes vehicle path plans and corrects for errors that may arise during the planning process for use in controlling the vehicle 10.

As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In various embodiments, the vehicle 10 is an autonomous vehicle and the system 100, and/or components thereof, are incorporated into the autonomous vehicle 10 (hereinafter referred to as the autonomous vehicle 10). The autonomous vehicle 10 is, for example, a vehicle that is automatically controlled to carry passengers from one location to another. The vehicle 10 is depicted in the illustrated embodiment as a passenger car, but it should be appreciated that any other vehicle, including motorcycles, trucks, sport utility vehicles (SUVs), recreational vehicles (RVs), marine vessels, aircraft, and the like, can also be used.

In an exemplary embodiment, the autonomous vehicle 10 corresponds to a level four or level five automation system under the Society of Automotive Engineers (SAE) "J3016" standard taxonomy of automated driving levels. Using this terminology, a level four system indicates "high automation," referring to a driving mode in which the automated driving system performs all aspects of the dynamic driving task, even if a human driver does not respond appropriately to a request to intervene. A level five system, on the other hand, indicates "full automation," referring to a driving mode in which the automated driving system performs all aspects of the dynamic driving task under all roadway and environmental conditions that can be managed by a human driver. It will be appreciated, however, that the embodiments in accordance with the present subject matter are not limited to any particular taxonomy or rubric of automation categories. Furthermore, systems in accordance with the present embodiment may be used in conjunction with any autonomous or other vehicle that utilizes a navigation system and/or other systems to provide route guidance and/or implementation.

As shown, the autonomous vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16 and 18 according to selectable speed ratios. According to various embodiments, the transmission system 22 may include a step-ratio automatic transmission, a continuously-variable transmission, or other appropriate transmission.

The brake system 26 is configured to provide braking torque to the vehicle wheels 16 and 18. Brake system 26 may, in various embodiments, include friction brakes, brake by wire, a regenerative braking system such as an electric machine, and/or other appropriate braking systems.

The steering system 24 influences a position of the vehicle wheels 16 and/or 18. While depicted as including a steering wheel 25 for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n might include, but are not limited to, radars, lidars, global positioning systems, optical cameras, thermal cameras, ultrasonic sensors, and/or other sensors. The actuator system 30 includes one or more actuator devices 42a-42n that control one or more vehicle features such as, but not limited to, the propulsion system 20, the transmission system 22, the steering system 24, and the brake system 26. In various embodiments, autonomous vehicle 10 may also include interior and/or exterior vehicle features not illustrated in FIG. 1, such as various doors, a trunk, and cabin features such as air, music, lighting, touch-screen display components (such as those used in connection with navigation systems), and the like.

The data storage device 32 stores data for use in automatically controlling the autonomous vehicle 10. In various embodiments, the data storage device 32 stores defined maps of the navigable environment. In various embodiments, the defined maps may be predefined by and obtained from a remote system (described in further detail with regard to FIG. 2). For example, the defined maps may be assembled by the remote system and communicated to the autonomous vehicle 10 (wirelessly and/or in a wired manner) and stored in the data storage device 32. Route information may also be stored within data device 32—i.e., a set of road segments (associated geographically with one or more of the defined maps) that together define a route that the user may take to travel from a start location (e.g., the user's current location) to a target location. Also in various embodiments, the data storage device 32 stores processing algorithms and data for processing three-dimensional point clouds to determine velocity of objects in the surroundings on a frame by frame basis. As will be appreciated, the data storage device 32 may be part of the controller 34, separate from the controller 34, or part of the controller 34 and part of a separate system.

The controller 34 includes at least one processor 44 and a computer-readable storage device or media 46. The processor 44 may be any custom-made or commercially available processor, a central processing unit (CPU), a graphics processing unit (GPU), an auxiliary processor among several processors associated with the controller 34, a semiconductor-based microprocessor (in the form of a microchip or chip set), any combination thereof, or generally any device for executing instructions. The computer readable storage device or media 46 may include volatile and non-volatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the autonomous vehicle 10, and generate control signals that are transmitted to the actuator system 30 to automatically control the components of the autonomous vehicle 10 based on the logic, calculations, methods, and/or algorithms. Although only one controller 34 is shown in FIG. 1, embodiments of the autonomous vehicle 10 may include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10. In one embodiment, as discussed in detail below, controller 34 is configured for use in processing three-dimensional imaging data of surroundings of the vehicle 10 in the form of point clouds to determine velocity on a frame by frame basis for use in autonomous control of the vehicle.

Figure 2:
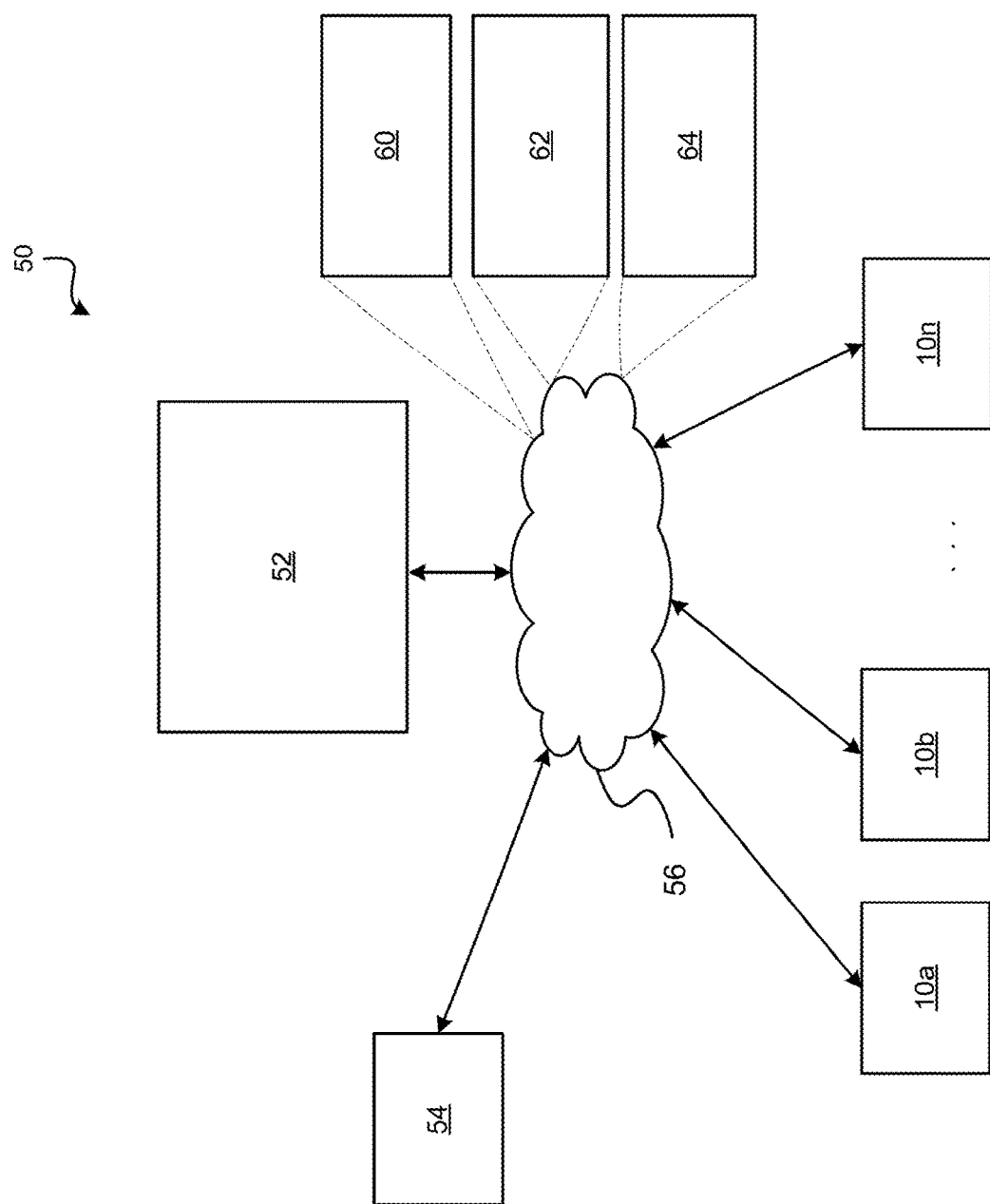
FIG. 2 is a functional block diagram illustrating a transportation system having one or more autonomous vehicles as shown in FIG. 1, in accordance with various embodiments.

The communication system 36 is configured to wirelessly communicate information to and from other entities 48, such as but not limited to, other vehicles ("V2V" communication), infrastructure ("V2I" communication), remote transportation systems, and/or user devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

With reference now to FIG. 2, in various embodiments, the autonomous vehicle 10 described with regard to FIG. 1 may be suitable for use in the context of a taxi or shuttle system in a certain geographical area (e.g., a city, a school or business campus, a shopping center, an amusement park, an event center, or the like) or may simply be managed by a remote system. For example, the autonomous vehicle 10 may be associated with an autonomous vehicle based remote transportation system. FIG. 2 illustrates an exemplary embodiment of an operating environment shown generally at 50 that includes an autonomous vehicle based remote transportation system (or simply "remote transportation system") 52 that is associated with one or more autonomous vehicles 10a-10n as described with regard to FIG. 1. In various embodiments, the operating environment 50 (all or a part of which may correspond to entities 48 shown in FIG. 1) further includes one or more user devices 54 that communicate with the autonomous vehicle 10 and/or the remote transportation system 52 via a communication network 56.

The communication network 56 supports communication as needed between devices, systems, and components supported by the operating environment 50 (e.g., via tangible communication links and/or wireless communication links). For example, the communication network 56 may include a wireless carrier system 60 such as a cellular telephone system that includes a plurality of cell towers (not shown), one or more mobile switching centers (MSCs) (not shown), as well as any other networking components required to connect the wireless carrier system 60 with a land communications system. Each cell tower includes sending and receiving antennas and a base station, with the base stations from different cell towers being connected to the MSC either directly or via intermediary equipment such as a base station controller. The wireless carrier system 60 can implement any suitable communications technology, including for example, digital technologies such as CDMA (e.g., CDMA2000), LTE (e.g., 4G LTE or 5G LTE), GSM/GPRS, or other current or emerging wireless technologies. Other cell tower/base station/MSC arrangements are possible and could be used with the wireless carrier system 60. For example, the base station and cell tower could be co-located at the same site or they could be remotely located from one another, each base station could be responsible for a single cell tower or a single base station could service various cell towers, or various base stations could be coupled to a single MSC, to name but a few of the possible arrangements.

Apart from including the wireless carrier system 60, a second wireless carrier system in the form of a satellite communication system 64 can be included to provide uni-directional or bi-directional communication with the autonomous vehicles 10a-10n. This can be done using one or more communication satellites (not shown) and an uplink transmitting station (not shown). Uni-directional communication can include, for example, satellite radio services, wherein programming content (news, music, and the like) is received by the transmitting station, packaged for upload, and then sent to the satellite, which broadcasts the programming to subscribers. Bi-directional communication can include, for example, satellite telephony services using the satellite to relay telephone communications between the vehicle 10 and the station. The satellite telephony can be utilized either in addition to or in lieu of the wireless carrier system 60.

A land communication system 62 may further be included that is a conventional land-based telecommunications network connected to one or more landline telephones and connects the wireless carrier system 60 to the remote transportation system 52. For example, the land communication system 62 may include a public switched telephone network (PSTN) such as that used to provide hardwired telephony, packet-switched data communications, and the Internet infrastructure. One or more segments of the land communication system 62 can be implemented through the use of a standard wired network, a fiber or other optical network, a cable network, power lines, other wireless networks such as wireless local area networks (WLANs), or networks providing broadband wireless access (BWA), or any combination thereof. Furthermore, the remote transportation system 52 need not be connected via the land communication system 62, but can include wireless telephony equipment so that it can communicate directly with a wireless network, such as the wireless carrier system 60.

Although only one user device 54 is shown in FIG. 2, embodiments of the operating environment 50 can support any number of user devices 54, including multiple user devices 54 owned, operated, or otherwise used by one person. Each user device 54 supported by the operating environment 50 may be implemented using any suitable hardware platform. In this regard, the user device 54 can be realized in any common form factor including, but not limited to: a desktop computer; a mobile computer (e.g., a tablet computer, a laptop computer, or a netbook computer); a smartphone; a video game device; a digital media player; a component of a home entertainment equipment; a digital camera or video camera; a wearable computing device (e.g., smart watch, smart glasses, smart clothing); or the like. Each user device 54 supported by the operating environment 50 is realized as a computer-implemented or computer-based device having the hardware, software, firmware, and/or processing logic needed to carry out the various techniques and methodologies described herein. For example, the user device 54 includes a microprocessor in the form of a programmable device that includes one or more instructions stored in an internal memory structure and applied to receive binary input to create binary output. In some embodiments, the user device 54 includes a GPS module capable of receiving GPS satellite signals and generating GPS coordinates based on those signals. In other embodiments, the user device 54 includes cellular communications functionality such that the device carries out voice and/or data communications over the communication network 56 using one or more cellular communications protocols, as are discussed herein. In various embodiments, the user device 54 includes a visual display, such as a touch-screen graphical display, or other display.

The remote transportation system 52 includes one or more backend server systems, not shown), which may be cloud-based, network-based, or resident at the particular campus or geographical location serviced by the remote transportation system 52. The remote transportation system 52 can be manned by a live advisor, an automated advisor, an artificial intelligence system, or a combination thereof. The remote transportation system 52 can communicate with the user devices 54 and the autonomous vehicles 10*a*-10*n* to schedule rides, dispatch autonomous vehicles 10*a*-10*n*, and the like. In various embodiments, the remote transportation system 52 stores store account information such as subscriber authentication information, vehicle identifiers, profile records, biometric data, behavioral patterns, and other pertinent subscriber information. In one embodiment, as described in further detail below, remote transportation system 52 includes a route database 53 that stores information relating to navigational system routes, including lane markings for roadways along the various routes, and whether and to what extent particular route segments are impacted by construction zones or other possible hazards or impediments that have been detected by one or more of autonomous vehicles 10*a*-10*n*.

In accordance with a typical use case workflow, a registered user of the remote transportation system 52 can create a ride request via the user device 54. The ride request will typically indicate the passenger's desired pickup location (or current GPS location), the desired destination location (which may identify a predefined vehicle stop and/or a user-specified passenger destination), and a pickup time. The remote transportation system 52 receives the ride request, processes the request, and dispatches a selected one of the autonomous vehicles 10*a*-10*n* (when and if one is available) to pick up the passenger at the designated pickup location and at the appropriate time. The transportation system 52 can also generate and send a suitably configured confirmation message or notification to the user device 54, to let the passenger know that a vehicle is on the way.

As can be appreciated, the subject matter disclosed herein provides certain enhanced features and functionality to what may be considered as a standard or baseline autonomous vehicle 10 and/or an autonomous vehicle based remote transportation system 52. To this end, an autonomous vehicle and autonomous vehicle based remote transportation system can be modified, enhanced, or otherwise supplemented to provide the additional features described in more detail below.

Figure 3:
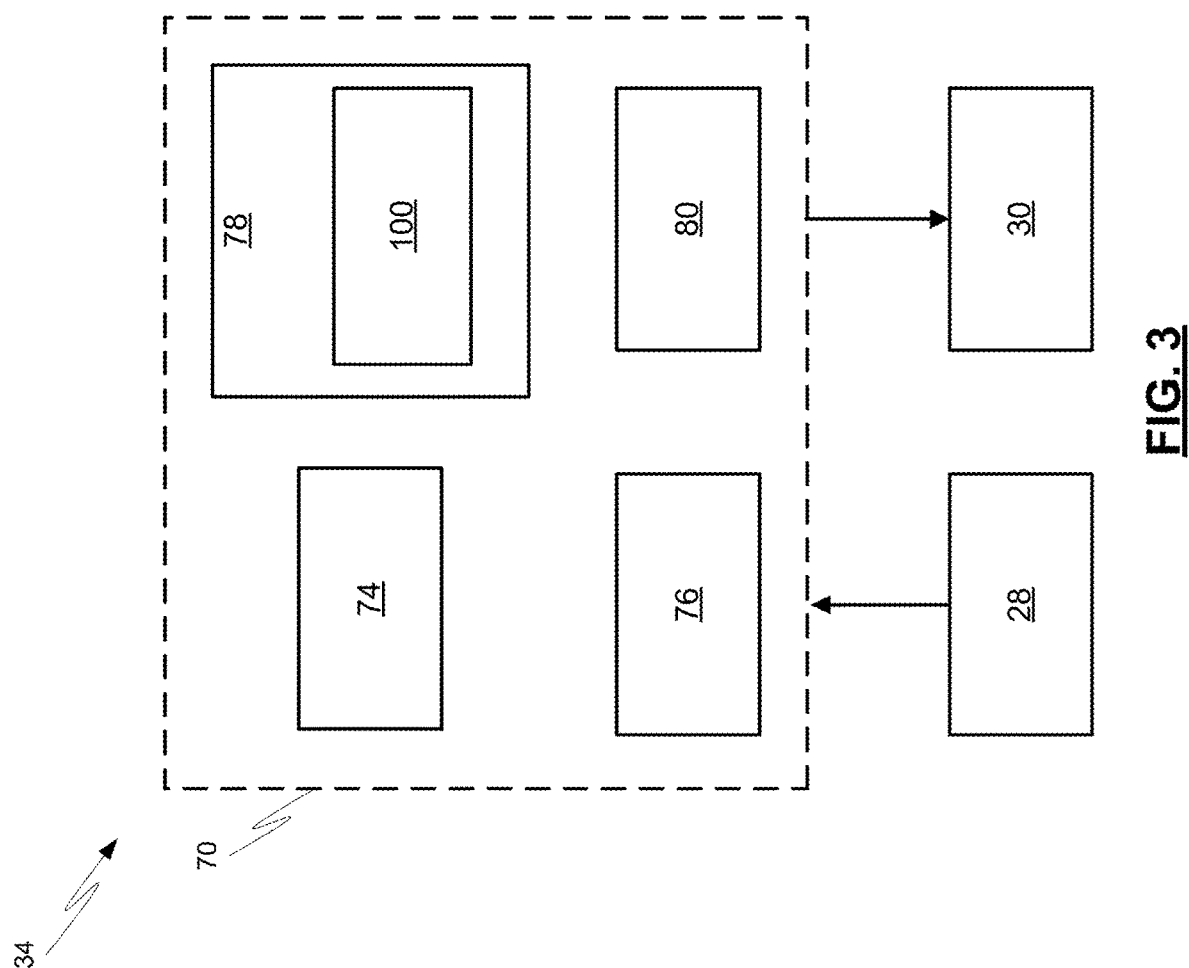
FIG. 3 is functional block diagram illustrating an autonomous driving system (ADS) associated with an autonomous vehicle, in accordance with various embodiments.

In accordance with various embodiments, controller 34 implements an autonomous driving system (ADS) 70 as shown in FIG. 3. That is, suitable software and/or hardware components of controller 34 (e.g., processor 44 and computer-readable storage device 46) are utilized to provide an autonomous driving system 70 that is used in conjunction with vehicle 10.

In various embodiments, the instructions of the autonomous driving system 70 may be organized by function or system. For example, as shown in FIG. 3, the autonomous driving system 70 can include a sensor fusion system 74, a positioning system 76, a guidance system 78, and a vehicle control system 80. As can be appreciated, in various embodiments, the instructions may be organized into any number of systems (e.g., combined, further partitioned, etc.) as the disclosure is not limited to the present examples.

In various embodiments, the sensor fusion system 74 synthesizes and processes sensor data and predicts the presence, location, classification, and/or path of objects and features of the environment of the vehicle 10. In various embodiments, the sensor fusion system 74 can incorporate information from multiple sensors, including but not limited to cameras, lidars, radars, and/or any number of other types of sensors.

The positioning system 76 processes sensor data along with other data to determine a position (e.g., a local position relative to a map, an exact position relative to lane of a road, vehicle heading, velocity, etc.) of the vehicle 10 relative to the environment. The guidance system 78 includes a vehicle path control system 100 to process sensor data along with other data to generate lateral spatial and longitudinal temporal plans. The plans are fused to create a path for the vehicle 10 to follow. The vehicle control system 80 generates control signals for controlling the vehicle 10 according to the determined path.

In various embodiments, the controller 34 implements machine learning techniques to assist the functionality of the controller 34, such as feature detection/classification, obstruction mitigation, route traversal, mapping, sensor integration, ground-truth determination, and the like.

Figure 4:
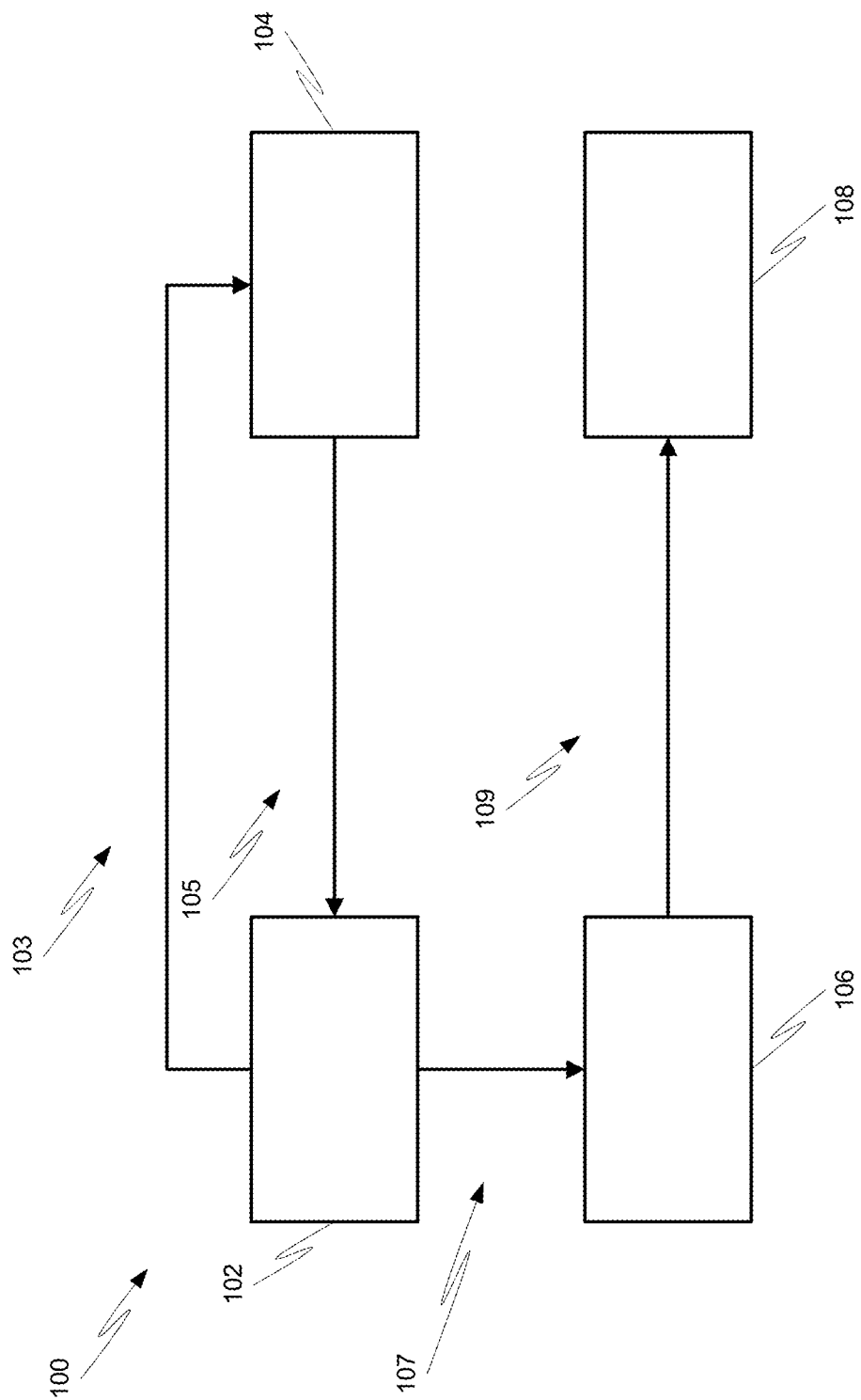
FIGS. 4 and 5 are functional block diagrams depicting a vehicle path control system, in accordance with various embodiments.

FIG. 4 depicts at 100 the vehicle path control system in accordance with various embodiments. The vehicle path control system 100 includes a planning system 102, a motion planner system 104, and a path follower system 106. The vehicle path control system 100 communicates with a low level controls system 108 that is, for example, a part of the vehicle control system 80 (FIG. 3). The vehicle path control system 100 generally optimizes path plans and corrects for errors that may arise during the planning process. The planning system 102 manages path pre-planning operations. The planning system 102 generates pre-planning data 103 for vehicle lateral control considerations (e.g., steering control) and pre-planning data 103 for longitudinal control considerations (e.g., brake and throttle control). The pre-planning data 103 can include road information, location/size of tracked objects within the vehicle's environment, etc. Such data 103 from the planning system 102 is derived from data provided by the vehicle sensor system, the data storage (e.g., map information), etc.

The motion planner system 104 uses the pre-planning data 103 from the planning system 102 as input to optimization models that identify candidate vehicle path plans and their costs 105 that satisfy path criteria. For example, the motion planner system 104 can be configured to use a cost model to generate a vehicle path plan that represents a feasible area within which the vehicle is to operate. The cost model can be solved for the smoothest collision-free path by considering positions and avoidance of dynamic obstacles within the vehicle's environment. Costs can include trajectory smoothness, trajectory consistency, etc. The resulting ideal vehicle path plans and costs 105 are provided to the planning system 102. The planning system 102 selects as the ideal vehicle path plan a winning vehicle path plan 107 based on the costs.

The path follower system 106 evaluates the ideal winning vehicle path plan 107 by examining the actual vehicle position with the ideal vehicle position as identified in the winning vehicle path plan 107. The actual vehicle position is provided by localization operations that involve local odometry that is based on inertial sensors and wheel encoders along with an iterative closest point algorithm that matches lidar returns to a previously generated ground map of lidar returns. If the path follower system 106 identifies a significant error between the two positions that results from the two positions differing by more than a pre-determined threshold value, the path follower system 106 corrects for this by solving for a path reentry plan that will take the vehicle from the current position to the winning path plan 107. To implement the correction plan, the path follower system 106 provides lateral (steering) and longitudinal (brake and throttle) commands 109 to a low level controls system 108. The low levels controls system 108 converts the lateral and longitudinal commands into desired steering angle and throttle/braking torque in order to track the plan.

Figure 5:
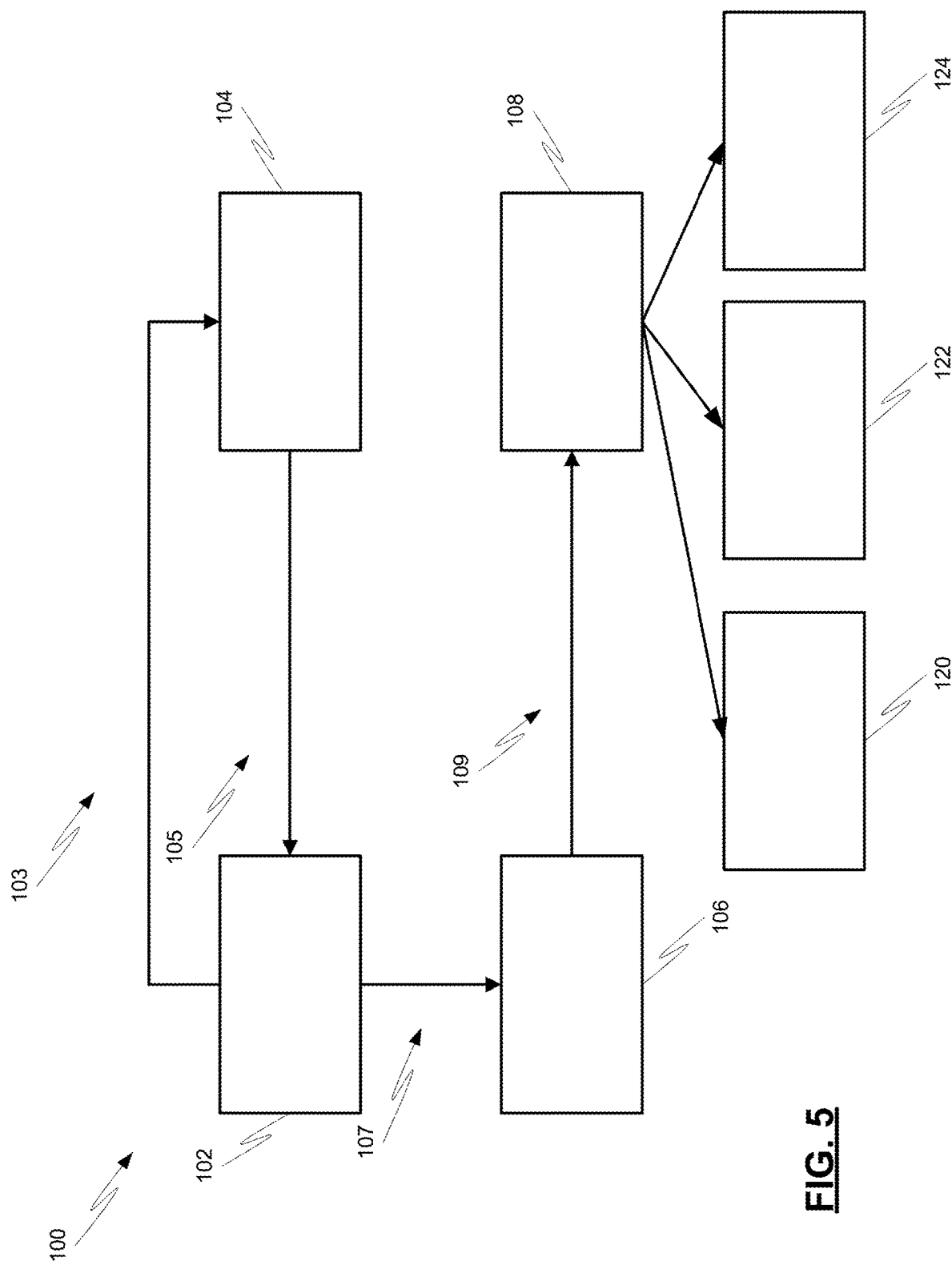

FIG. 5 illustrates that the low level controls system 108 of FIG. 4 can interact with various control units of the vehicle. These can include the vehicle's electric power steering unit 120, electric brake control module 122, and the engine control module 124. The interaction (e.g., transmission of commands) can be over the vehicle's bus that is connected to the electric power steering unit 120, electric brake control module 122, and engine control module 124.

Figure 6:
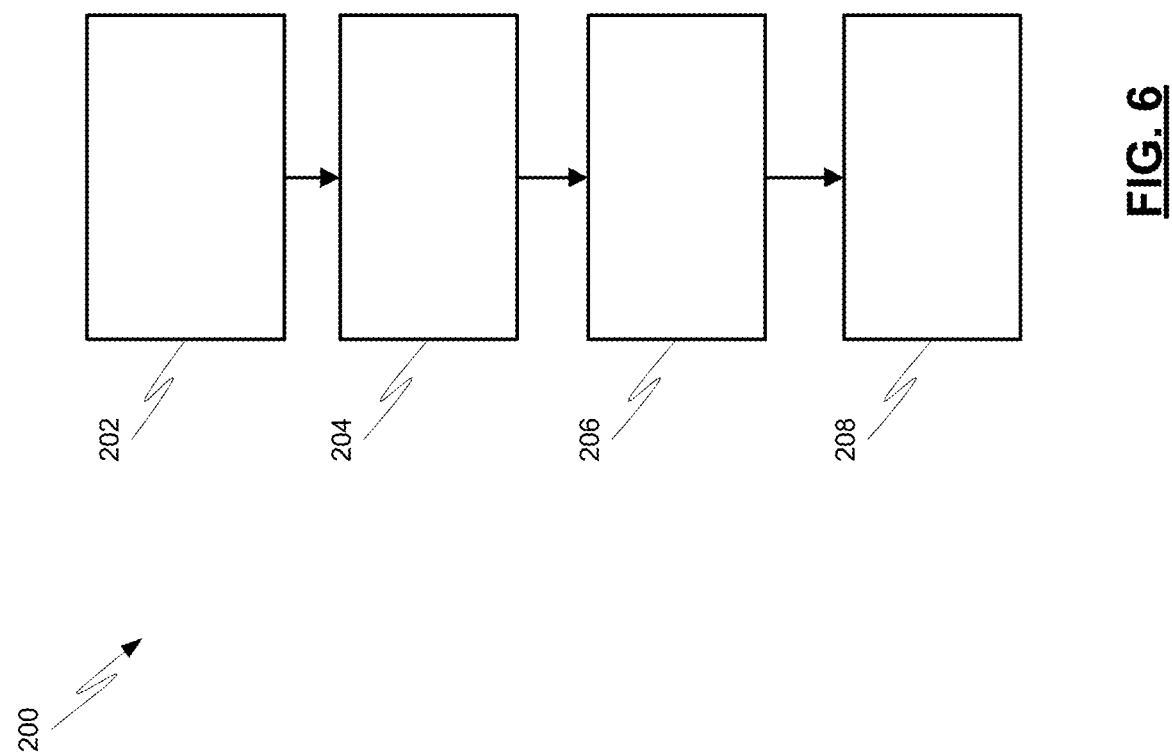
FIG. 6 is a flowchart depicting an operational scenario involving vehicle path planning, in accordance with various embodiments.

FIG. 6 depicts at 200 a method of vehicle path planning that may be performed, for example, by the vehicle path control system 100. At process block 202, lateral and longitudinal pre-planning data from the planning system is used as input to optimization models. More specifically in this example, cost models calculate costs for vehicle paths using the lateral and longitudinal pre-planning data for evaluating cost functions subject to vehicle path constraints.

At process block 204, the winning vehicle path is selected based on the results of the cost models. A local plan is generated at process block 206 based on lateral and longitudinal path re-entry data to adjust for any path errors. The local plan is converted into low level control commands at process block 208 in order to communicate the commands to vehicle control units, such as those related to steering, braking, etc.

Figure 7:
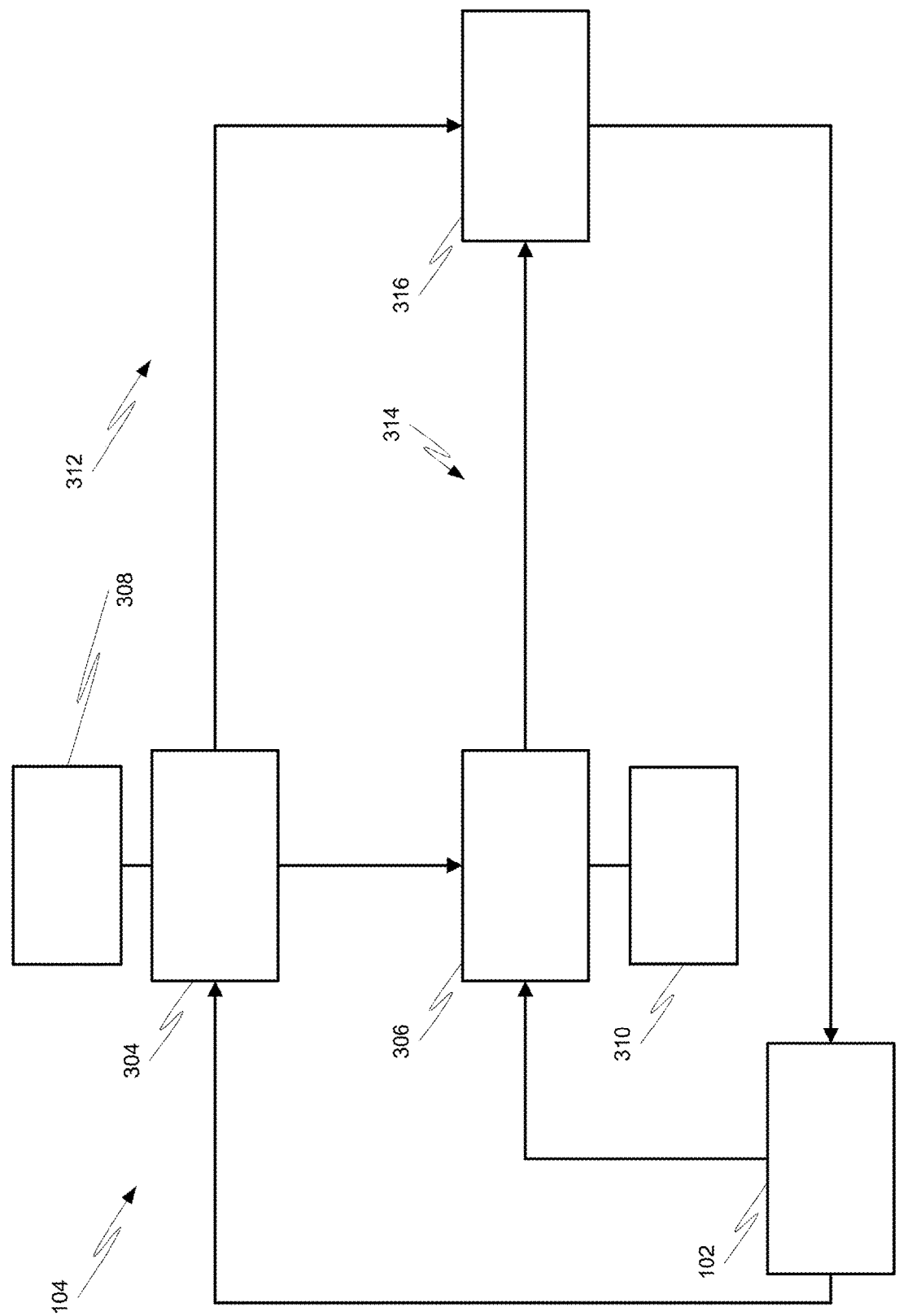
FIG. 7 is a functional block diagram depicting a vehicle motion planning system, in accordance with various embodiments.

FIG. 7 depicts an example of components within the vehicle motion planner system 104. The vehicle motion planner system 104 includes a lateral pre-planner module 304, a longitudinal pre-planner module 306, and a vehicle path constructor module 316. In this example, the components of the vehicle motion planner system 104 generate spatial (lateral) plans 312 and temporal (longitudinal) plans 314. A spatial (lateral) plan 312 includes the desired positions within a map, and a temporal (longitudinal) plan 314 provides the desired timing information for the path. The vehicle path constructor 316 stitches the spatial and temporal plans 312 and 314 together into a vehicle path for use by the planning system 102.

To generate the plans 312 and 314, the lateral pre-planner module 304 and longitudinal pre-planner module 306 receive input data from the planning system 102. The input data for the lateral pre-planner module 304 includes lateral pre-planning data (as referenced at 103 on FIG. 4), which can include the previous longitudinal solution from the longitudinal pre-planner 306, road information, perception information (e.g., location/size of tracked objects, etc.), etc. Based on the input data, the lateral pre-planner module 304 uses a cost model provided by a solver 308 to generate a feasible area within which the vehicle is to operate. Within this area, the lateral pre-planner module 304 solves for the smoothest collision-free path by considering positions of dynamic obstacles based on the previous longitudinal plan. The lateral pre-planner module 304 further determines how far (in travel) the vehicle will be at a specific time, so that the lateral pre-planner module 304 can know which occupancy movie frame to use when generating a specific CTE (cross track error) band. CTE bands are used to indicate acceptable areas of operation. CTE bands occur at lateral discrete spacing and are perpendicular to the lane center. CTE bands can be considered a linearization of the vehicle workspace about the center of the lane. CTE band generation is further discussed below with respect to FIG. 10.

The longitudinal pre-planner module 306 receives input from the planning system 102 (as referenced at 103 on FIG. 4) as well as the spatial plan from the lateral pre-planner module 304 and solves for a smoothest collision-free speed profile along the lateral path. This involves interpolating spatial quantities into a temporal discretization as well as considering other requirements, such as following distance, lateral acceleration, speed limits, etc. As an illustration, road curvature and road narrowing impact speed are calculated through a cost model provided by a solver 310 such that the vehicle slows down around a curve and slows down when space is tight between obstacles/objects.

As shown in FIG. 7, the lateral and longitudinal pre-planner modules 304 and 306 solve the lateral and longitudinal problems separately for a more computationally efficient solution of the problems in the plan generation process.

In this way, the calculations for the lateral and longitudinal problems through modules 304 and 306 are loosely coupled (e.g., indirectly coupled).

In one embodiment, the motion planner system 104 generates spatial and temporal plans 312 and 314 at a particular time interval, such as every 100 ms based on new sensor information. To set the initial condition, the previous 100 ms is used along with the current plan as the initial condition for optimization. Once engaged, the motion planner system 104 interpolates, in one embodiment, along the previous solution (as opposed to interpolating using a smooth localized pose). This allows the trajectory of an ideal kinematic vehicle to be subject to constraints that the real vehicle should be able to follow.

The lateral and longitudinal pre-planner modules 304 and 306 provide the spatial and temporal plans 312 and 314 to the vehicle path constructor module 316. The vehicle path constructor module 316 fuses the information between the spatial plan 312 (which contains the path positions within a map) and the temporal plan 314 (which contains the timing information for the path) to create a series of points along the path. The fusing of the information is performed by interpolation that packages the lateral and longitudinal information together at consistent intervals of time and/or space where each point has a time stamp and a travel along the lane. This results in each point along the path being associated with a time, x position, y position, velocity, acceleration, curvature, and heading, and creates the trajectory that is used as the reference for the path follower system 106. In this way, the results of the motion planner system 104 are combined with the processing of the path follower system 106. This helps ensure smoothness in the presence of localization jumps, model errors, etc. This also makes verification and testing more modular between planners and follower/low-level control.

Figure 8:
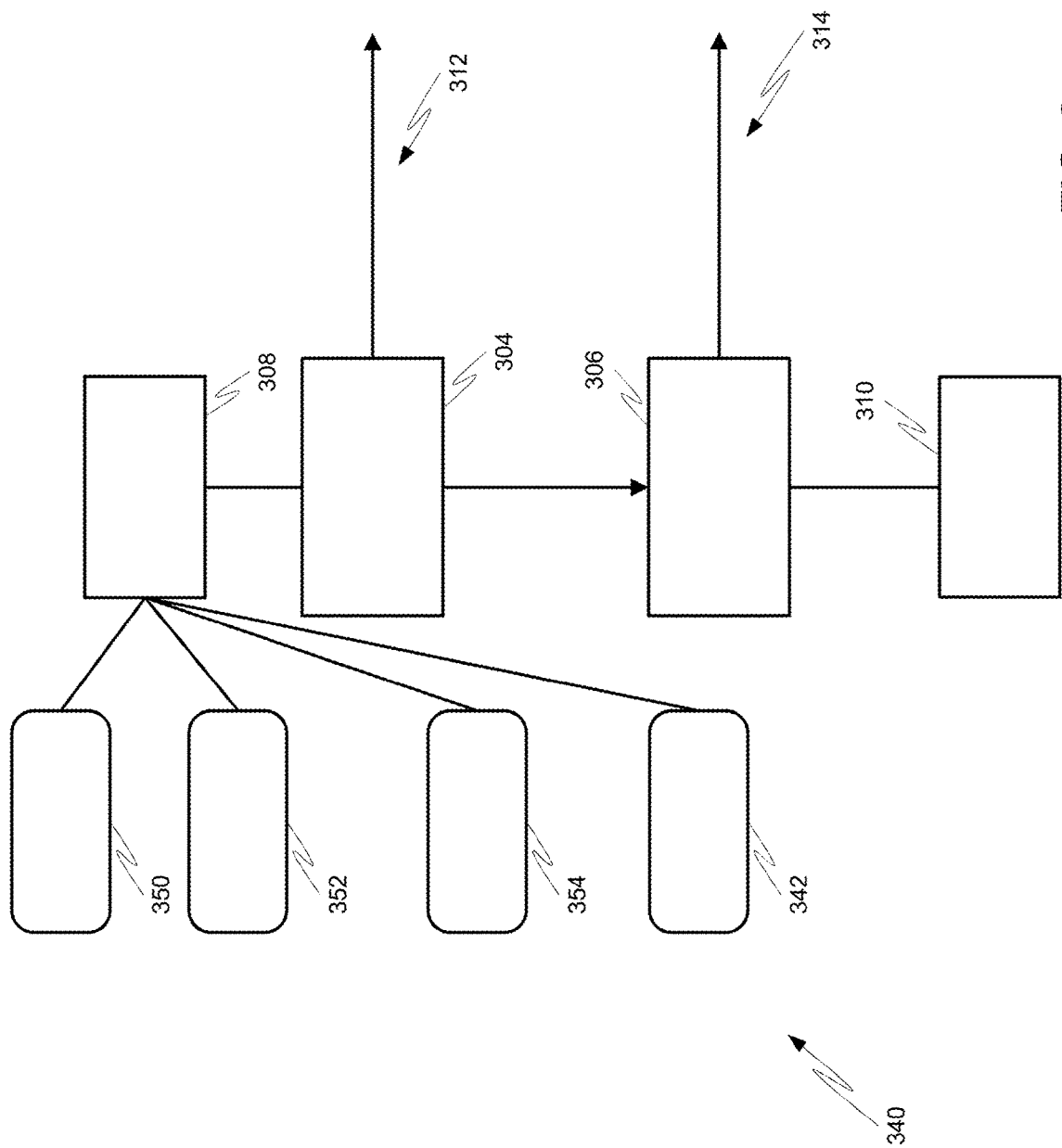
FIGS. 8 and 9 are functional block diagrams depicting optimization models for the vehicle motion planning system, in accordance with various embodiments.
Figure 9:
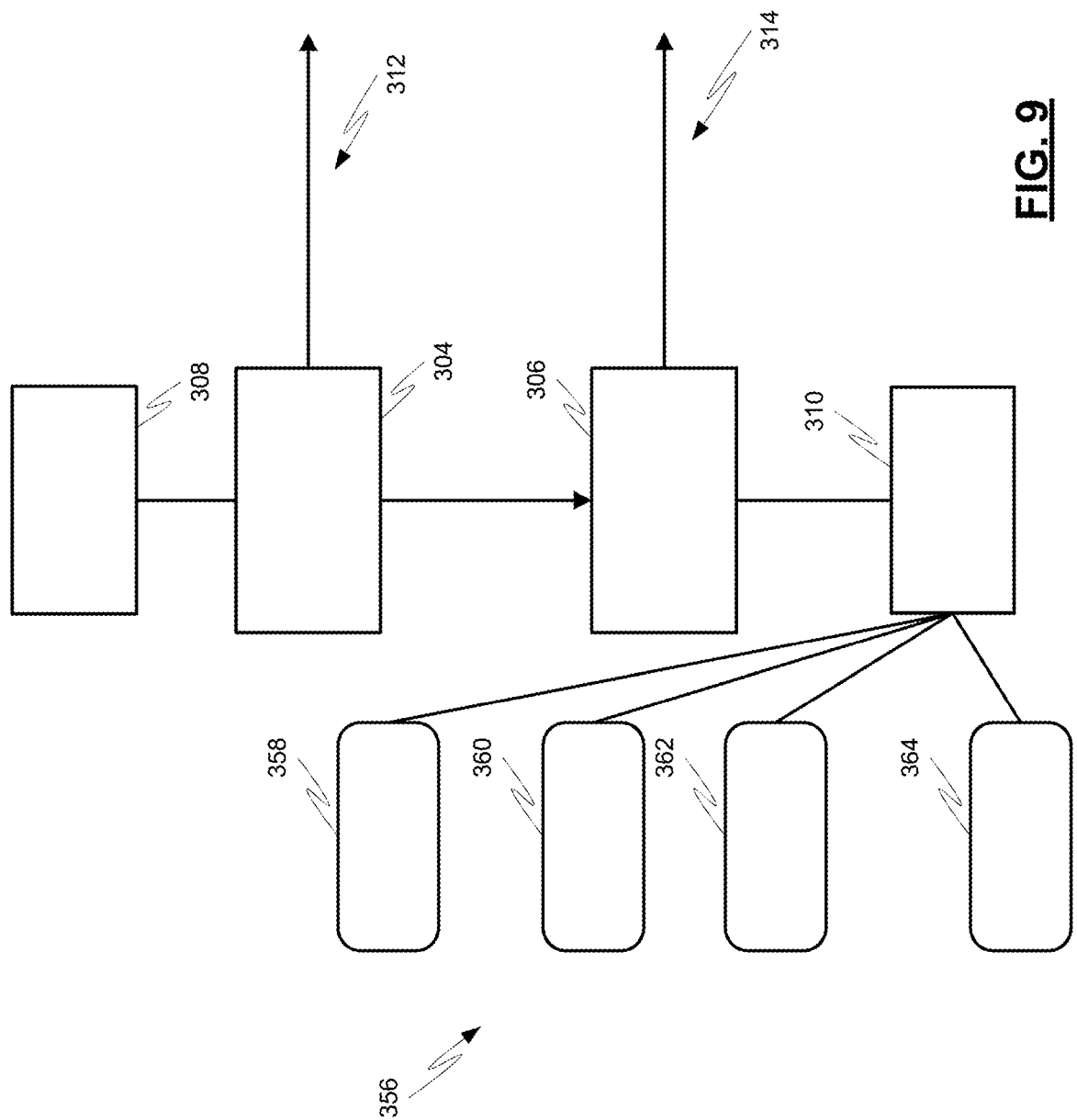

FIGS. 8 and 9 depict optimization control modeling at 340 and 356 that is used by the lateral and longitudinal pre-planner modules 304 and 306 to generate their respective plans 312 and 314. Optimization is performed by solving an optimal control problem for a short horizon into the future. The optimization includes, for example, using convex quadratic cost functions 342 and 358. A convex quadratic approach includes an optimization cost function, where the cost assumes the form: $x^T*Q*x$, where x is the vector of decision variables, and Q is a positive definite weighting matrix. Each variable has a quadratic cost which holds if Q is diagonal with greater than or equal elements.

The convex quadratic cost functions 342 and 358 include affine constraints (linear and constant constraints) as indicated at 352 and 362. The affine constraints 352 and 362 can be of the form $f<=A*x+c$, where f is a lower bound, A is a constraint matrix, x is the vector of decision variables, and c is a constant. These constraints have a mathematical structure which enables the optimization solution algorithm to solve quickly relative to a generic functional form.

As shown in FIG. 8 for the lateral pre-planner module 304, costs 354 to be optimized for the convex quadratic cost function 342 can include smoothness (e.g., minimizing lateral jerk, etc.) with 50 points being used for lateral and discretized at 0.5-2.5 m based on speed (25 m-150 m). Other costs 354 can include desired lateral placement in a lane.

The resolution points can be set so as to be sufficient to capture dynamics of the vehicle and obstacles. The horizon can also be sufficiently long enough to reach an "equilibrium" state near the end (e.g., lane center). The linearized formulation about the lane center may be modified in certain situations such that the modified lane center may not actually be the center of the mapped lanes.

Constraints 352 can include CTE (cross track error) constraints, such as the avoidance of obstacles, avoidance of lane boundaries (with the considerations that certain boundary types could be violated; e.g., "dotted-line" boundaries), etc. Other constraints can include satisfying turn radius (curvature) constraints of the car, steering wheel velocity, and steering wheel acceleration using previous longitudinal solution, etc.

A kinematic model 350 is used to model the motion of objects within the area of the autonomous vehicle. The kinematic model 350 can describe for the objects position, velocity, acceleration, etc. This information is used in optimizing the cost function, such as with respect to minimizing lateral jerk. Kinematic model 350 can have the following states: deviation from lane center; heading; curvature; spatial jerk (spatial derivative of curvature); etc.

The following provides an illustration of evaluating the quadratic cost function 342 for the lateral pre-planner module 304. The planning system 102 provides input data to the lateral pre-planner module 304. The input data can include road boundaries from a map, such as dotted-line boundary information and solid-line boundary information as well. In evaluating the quadratic cost function 342, a dotted-line boundary can be violated more if needed. Other inputs into the model can include: center line (from a map, including metadata about lane), speed limits, school zones/speed bumps/road grade; perception information (e.g., location/size of tracked objects, prediction of object trajectories over the planning horizon); and stop points (e.g., stopping at an intersection if the light is red, or there is a stop sign, etc.).

FIG. 9 shows example costs 364 for the longitudinal pre-planner module 306. The costs 364 for the convex quadratic cost function 358 to optimize can include: smoothness and consistency of the trajectories; velocity and distance tracking; balancing comfort and reasonable forward acceleration profiles; smooth following of vehicles; smooth slowdowns for turns; etc. The resolution can include setting 24 points for longitudinal, discretized at 0.5 sec. (i.e., 12 seconds). This resolution can be set so as to be sufficient to capture relevant dynamics of the vehicle and other obstacles. The horizon can also be sufficiently long enough to see curvature and intersections far ahead of us and obstacles.

Constraints 362 for the quadratic cost function 358 can include:

speed limits, such as: satisfaction of lateral acceleration, steering wheel velocity, and steering wheel acceleration constraints based on lateral path; "road narrowing slowdown" based on the amount the CTE band (e.g., acceptable operating area) is reduced by obstacles; etc.

acceleration limits, such as "hard" limits based on capabilities of vehicle; "soft" forward acceleration limits based on comfort; etc.

jerk limits based on the capabilities of vehicle.

satisfying "stop-lines" such as intersections or red lights.

urgent constraint to maintain safe following distance behind obstacles.

soft constraint to maintain a longer following distance behind obstacles, where a soft constraint is typically violated such that there may be a "springy" response to changes in the lead vehicle velocity.

A kinematic model 360 generates information about the motion of objects within the area of the autonomous vehicle. This information is used in optimizing the quadratic cost function 358, such as with respect to acceleration limits. The kinematic model 360 can have the following states: travel (e.g., arclength along the lateral path); velocity; acceleration; jerk; etc.

Figure 10:
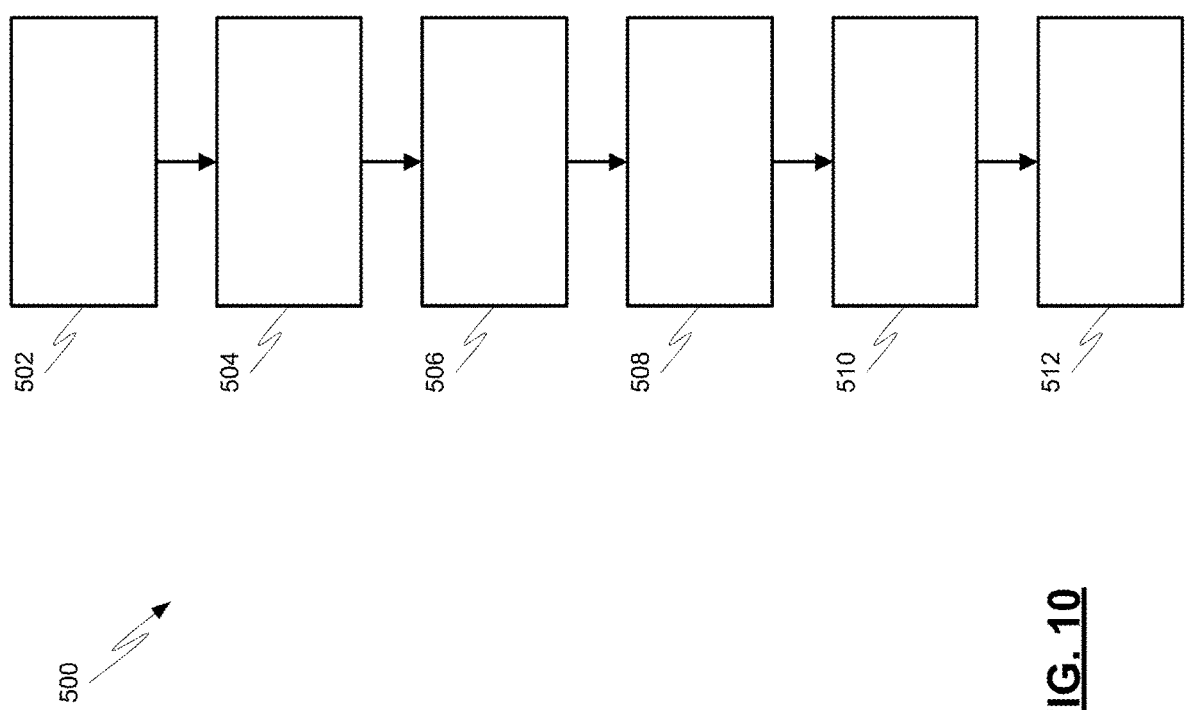
FIG. 10 is a flowchart depicting lateral pre-processing operations, in accordance with various embodiments.

FIG. 10 depicts at 500 lateral pre-processing operations related to CTE ("cross track error") band generation. As discussed with respect to FIG. 7, CTE (cross track error) bands are used as part of the lateral pre-planner module's operations. CTE bands are used to indicate acceptable areas of vehicle operation. CTE bands are generated based on lane center and lane boundaries and visually resemble train tracks. These occur at the lateral discretization spacing and are drawn perpendicular to the lane center. CTE bands can be considered a linearization of the vehicle workspace about the center of the lane.

With reference to FIG. 10, the CTE bands are generated at process block 502 by creating perpendicular lines to the lane center that extend out to the lane boundaries. Each CTE band is split at process block 504 into a set number of points (e.g., 50 points) laterally from one lane boundary to the other. At process block 506, a CTE band is shrunk based on what area is safe for the autonomous vehicle to drive in. Process block 508 determines (in travel) how far the autonomous vehicle is expected to be at a specific time. This is performed by using the previous longitudinal solution.

Process block 510 finds the locations of obstacles that are predicted to be at that specific time along the CTE band in question. At process block 512, the CTE band is generated such that the CTE band represents a location where the rear axle of the autonomous vehicle can drive free of predicted obstacles. Any point on the CTE band indicates that a vehicle-shaped polygon (centered at the rear axle) is clear of collisions.

Figure 11:
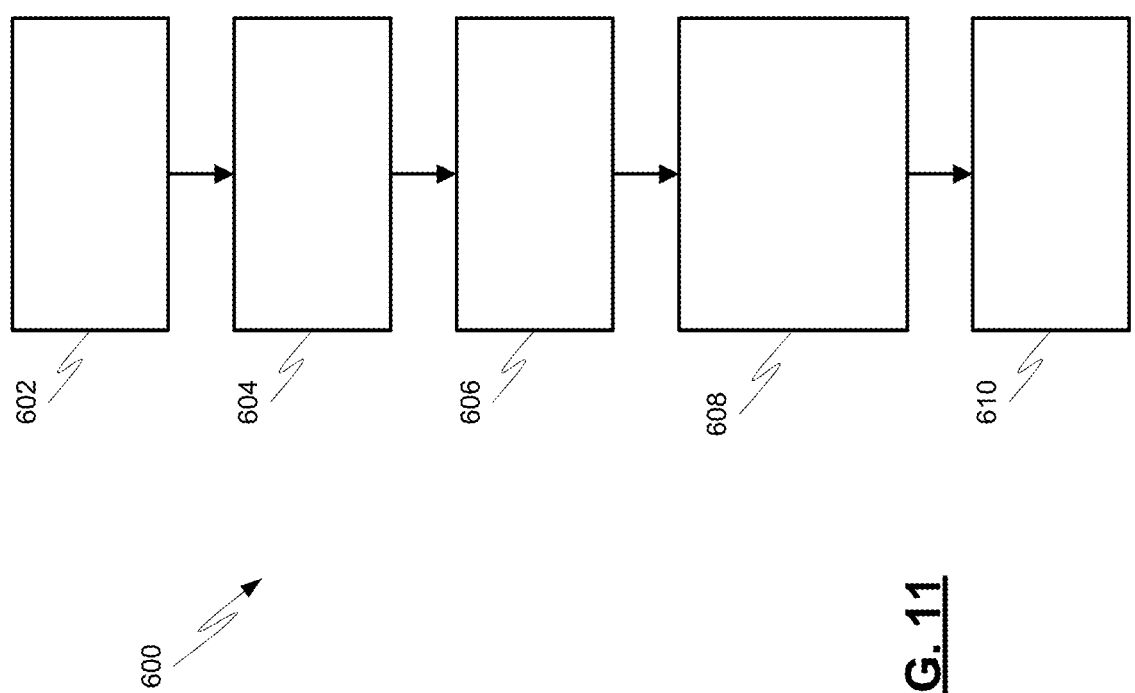
FIG. 11 is a flowchart depicting longitudinal pre-processing operations, in accordance with various embodiments.

FIG. 11 depicts at 600 longitudinal pre-processing operations for determining smoothest collision-free speed profile along the lateral path provided by the lateral pre-planner module. Process block 602 uses the previous longitudinal plan and the most recently solved lateral plan to interpolate spatial quantities into time discretization. This is performed at process block 604 by converting road curvature and road narrowing into time based on the expected time the autonomous vehicle will reach each location in space.

Process block 606 identifies obstacles along the path by querying for each step in the longitudinal plan horizon the objects predicted to be at that time. This is determined by traversing forward along the lateral path until a collision is identified.

Process block 608 solves for the smoothest collision-free speed profile along the lateral path, with consideration of other constraints (e.g., following distance, lateral acceleration, speed limits, etc.). In this example, solving for the speed profile is performed using an "inner iteration," which allows for convergence of spatial quantities into the temporal discretization as indicated at process block 610. The inner iteration involves a sequence of "longitudinal preprocessing" and then "longitudinal solve," which is repeated until spatial quantities converge. More specifically, the longitudinal preprocess uses the previous step's longitudinal solution in the first inner iteration and uses the previous iteration longitudinal solution obtained in subsequent interactions. The longitudinal solve provides a new longitudinal solution for use in the next iteration of the preprocess steps. This process is repeated (e.g., up to 3 times) to allow for convergence.

Figure 12:
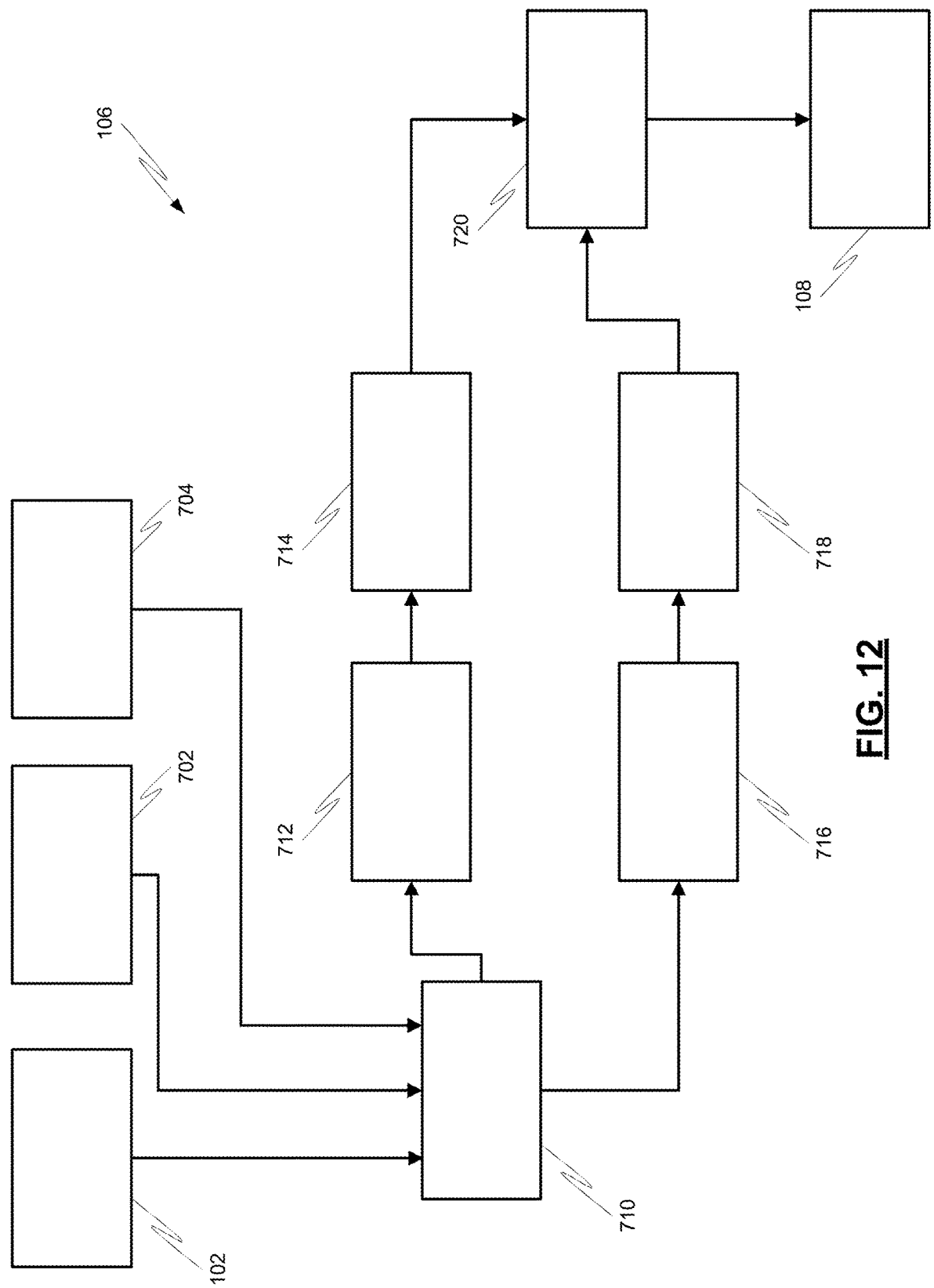
FIG. 12 is a functional block diagram depicting a vehicle path follower system, in accordance with various embodiments.

FIG. 12 depicts at 106 a path follower system. The path follower system 106 connects real life (e.g., smooth localized pose) with the ideal vehicle location along the plan (e.g., "ghost pose"). If the localization system 702 jumps or low level controls system 108 has an error, the path follower system 106 corrects for this by solving for a kinematically feasible reentry plan from the current position to the actual plan.

Similar to the motion planner system 104, the path follower system 106 is also decoupled into longitudinal and lateral processing at 712 and 716, with each being formulated as a quadratic optimization problem as indicated at 714 and 718. The path follower system 106 runs at 50 Hz which is the frequency of the smooth localized pose. The initial position is from localization and is used to determine lateral and longitudinal reentry errors.

A spline library 710 receives input data from the planning system 102, localization system 702, and odometry 704 in order to determine both lateral re-entry error and longitudinal re-entry error. The spline library 710 achieves this by computing the closest point along a splined path to the vehicle's current position. This point is decomposed into lateral and longitudinal components based on the vehicle's current heading. Alternate interpolation methods (other than splines) could also be used.

The lateral re-entry planner module 712 uses a spatial discretized optimization to correct for the lateral re-entry error. The optimization determines the optimal curvature, heading, and CTE trajectory to follow the elongated vehicle path. The lateral re-entry planner module 712 uses a similar kinematic model as the lateral pre-planner module described above as well as similar curvature constraints (but at a slightly more "open" or permissive level).

The longitudinal re-entry planner module 716 uses a temporal discretized optimization to correct for the longitudinal re-entry error. The optimization determines the optimal acceleration/velocity/travel trajectory to follow the vehicle path. The longitudinal re-entry planner module 716 uses a similar kinematic model as the longitudinal pre-planner module described above as well as similar acceleration and jerk constraints (but at a slightly more "open" or permissive level).

Solutions from the longitudinal and lateral re-entry planner modules 712 and 716 are then combined together to generate a local plan at 720, which serves as the reference for low level controls system 108. The local plan can contain time, position (x, y), velocity, acceleration, heading, curvature and derivative of curvature.

Figure 13:
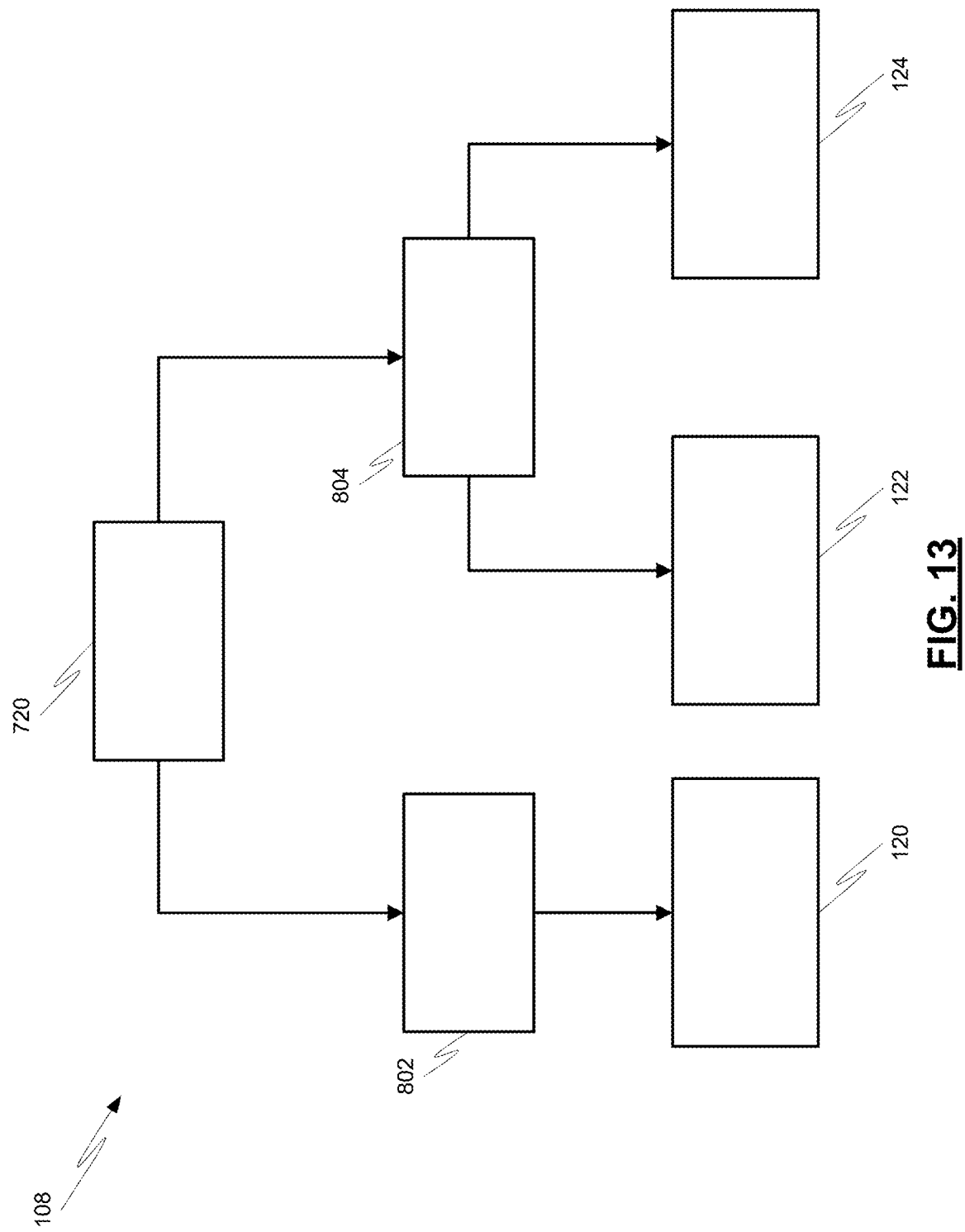
FIG. 13 is a functional block diagram depicting a vehicle low level controls system, in accordance with various embodiments.
Figure 14:
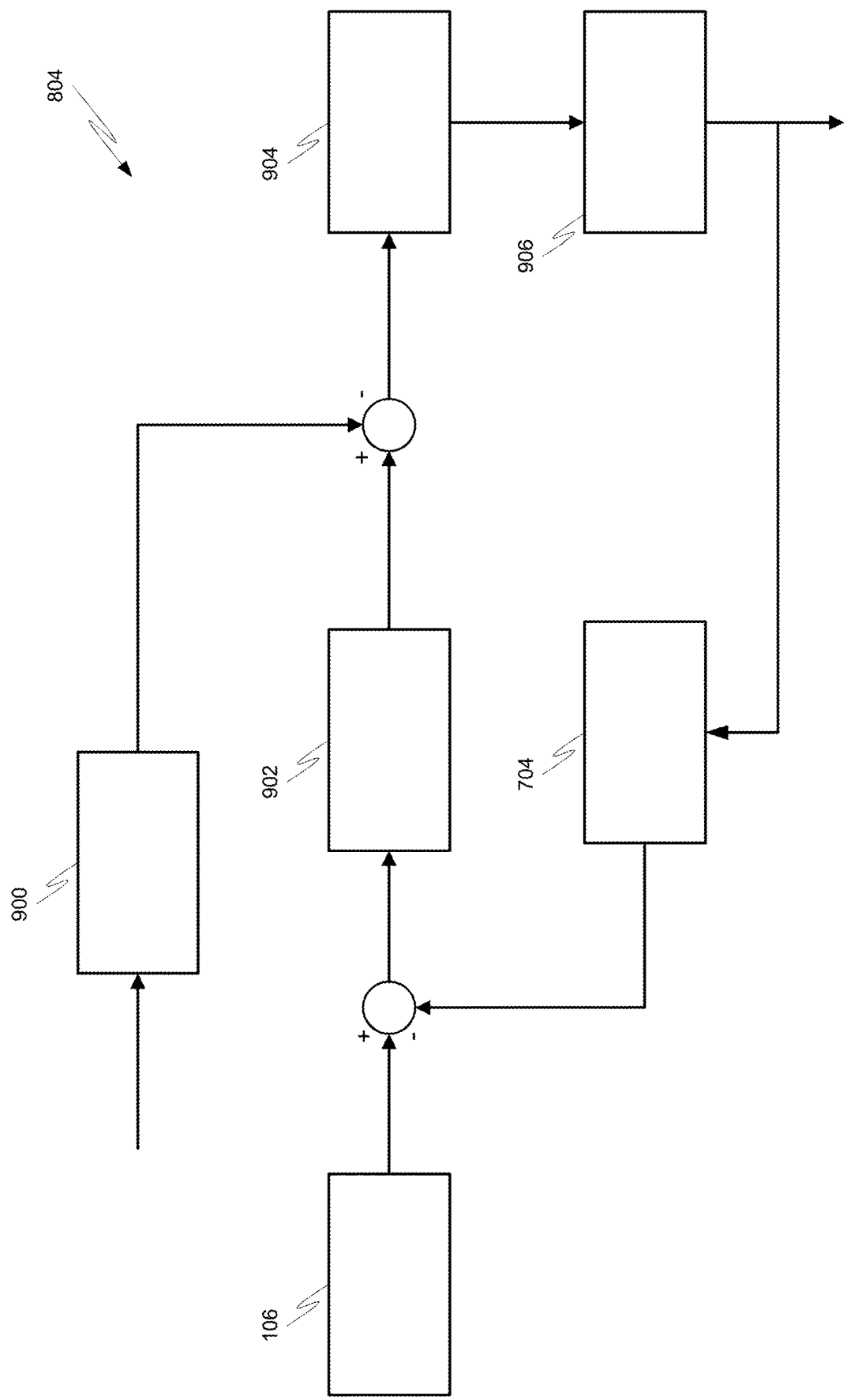
FIG. 14 is a control block diagram depicting a feedforward control system, in accordance with various embodiments.

FIGS. 13 and 14 depict components of a low level controls system 108. With reference to FIG. 13, the low level controls system 108 solves for desired steering angle and throttle/braking torque to track the given local plan that was generated at 720. The low level controls system 108 runs at 100 Hz. Within the low level controls system 108, a lateral controller 802 takes the local plan and solves for desired curvature. The lateral controller 802 maps to steering angle for use in controlling the electric power steering 120.

A longitudinal controller 804 solves for desired throttle or braking torque using PID (proportional-integral-derivative) and feed forward approaches which are described below with respect to FIG. 14. The electric brake control module 122 uses the solved desired braking torque value in its control operations. The engine control module 124 uses the solved desired throttle value in a similar manner. The longitudinal controller 804 accounts for actuator delays by looking ahead along the local plan by the expected amount of delay. The longitudinal controller 804 solves for the desired throttle or braking torque using a PID and feed forward approach as depicted in FIG. 14

FIG. 14 depicts a control system for use with the longitudinal controller 804 of the low levels controls system 108.

The longitudinal controller 804 receives reference velocity and velocity estimation from odometry 704 in order to solve for the desired acceleration. The data from odometry 704 is based upon measurements from the vehicle's IMU (e.g., an inertial measurement unit containing gyros and accelerometers) and wheel encoders. These provide non-linear state estimations for attitude (e.g., roll, pitch, and yaw), velocity, acceleration, etc.

The control system has a control loop 902 (e.g., a proportional-integral-derivative (PID) loop) around the velocity error plus a feedforward term 900 that accounts for the lookahead acceleration in the local plan as well as the pitch from odometry 704. The desired acceleration is then converted by a model 904 to the desired input for the specific interfaces of the vehicle 906. For example, the inputs for a particular vehicle model type may be throttle or braking torque, which are converted using a model based on wheel diameter and mass of the vehicle. For a different vehicle model type, the inputs could be percentage of brake and throttle pedal positions, which are converted from the desired acceleration by the model 904. Additional parameters for the model 904 include vehicle mass, wheel radius, lumped inertia of the drivetrain, aerodynamic drag terms, rolling resistance terms, drag due to tire slippage when turning, etc.

The commands generated by the model 904 are sent over the vehicle's bus to the propulsion and brake control units. The control units adjust motor current, regenerative braking load, and friction brake caliper pressure in order for the vehicle 906 to follow the correct calculated vehicle path.

The planning system 102 manages path pre-planning operations. The planning system 102 generates pre-planning data 103 for vehicle lateral control considerations (e.g., steering control) and pre-planning data 103 for longitudinal control considerations (e.g., brake and throttle control). The pre-planning data 103 can include road information, location/size of tracked objects within the vehicle's environment, etc. Such data 103 from the planning system 102 is derived from data provided by the vehicle sensor system, the data storage (e.g., map information), etc.

Figure 15:
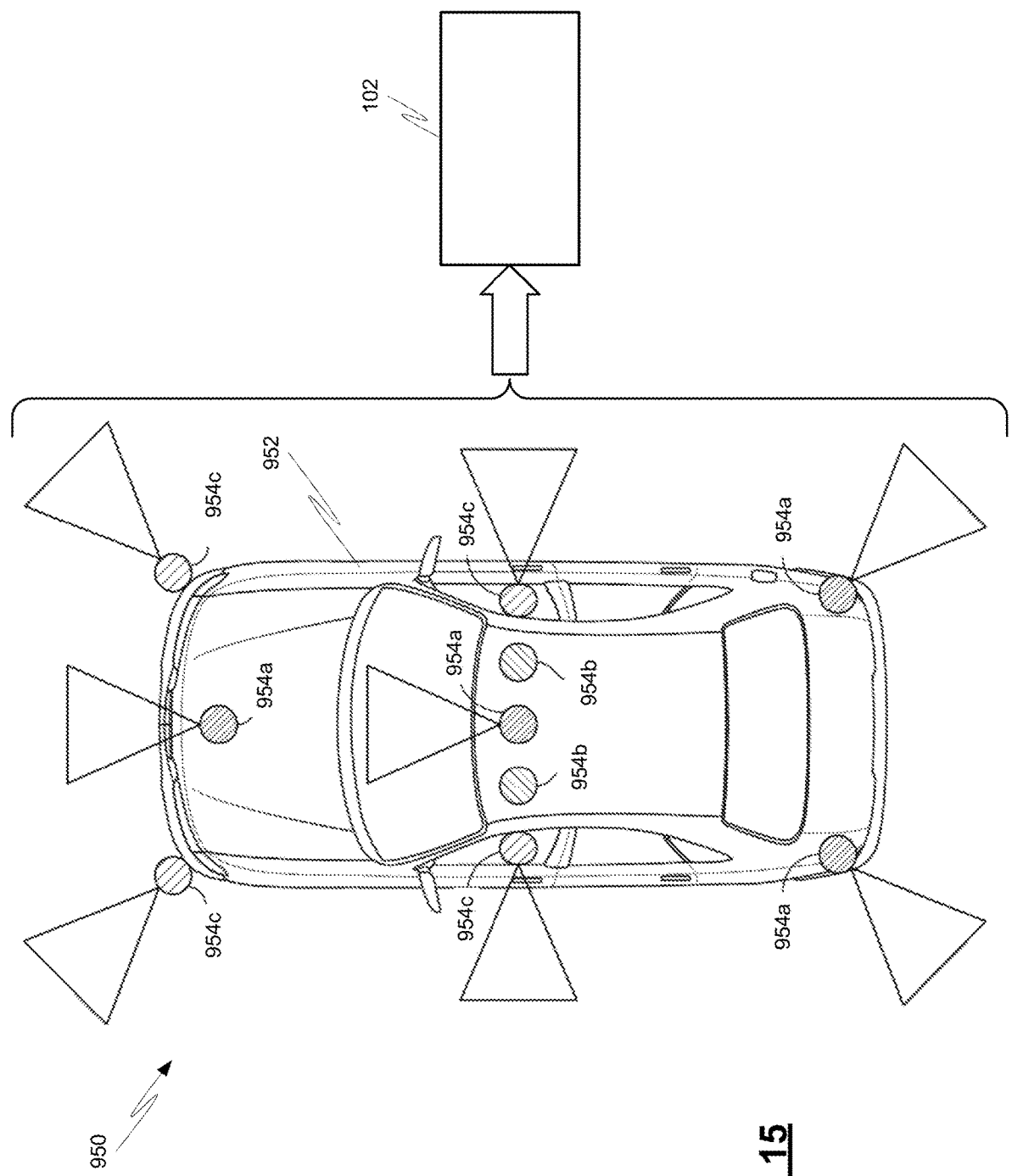
FIG. 15 depicts an exemplary vehicle that includes a plurality of radar devices, cameras, and lidar devices that are distributed about the vehicle in accordance with various embodiments of the present disclosure.

As discussed with respect to FIG. 4, the planning system 102 manages path pre-planning operations. The planning system 102 generates pre-planning data 103 for vehicle lateral control considerations (e.g., steering control) and pre-planning data 103 for longitudinal control considerations (e.g., brake and throttle control). The pre-planning data 103 is derived from data provided by the vehicle sensor system. FIG. 15 depicts an example of the vehicle sensor system at 950 for an exemplary autonomous vehicle 952. The vehicle sensor system at 950 includes a plurality of radar devices 954a distributed about the vehicle 952, a plurality of cameras 954b distributed about the vehicle 952 and a plurality of lidar devices 954c distributed about the vehicle 952. This combination of sensors within a vehicle's sensor system 28 obtains information for environment and object detection and analysis. Many different types of sensor configurations can be used as shown, for example, in FIG. 15.

The radar devices 954a are disposed at different locations of the vehicle 952, and in one embodiment, are disposed symmetrically about the longitudinal axis of the vehicle 952 to achieve parallax. Each of the radar devices 954a may include or incorporate components suitably configured to horizontally and rotatably scan the environment to generate radar data that is consumed by other systems.

The cameras 954b are also disposed at different locations and oriented to provide different field of views that capture different portions of the surrounding environment in the vicinity of the vehicle 952. For example, a first camera 954b is positioned at the front left (or driver) side of the vehicle 952 and has its field of view oriented 45° counterclockwise relative to the longitudinal axis of the vehicle 952 in the forward direction, and another camera 954b may be positioned at the front right (or passenger) side of the vehicle 952 and has its field of view oriented 45° clockwise relative to the longitudinal axis of the vehicle 952. Additional cameras 954b are positioned at the rear left and right sides of the vehicle 952 and similarly oriented away from the longitudinal axis at 45° relative to the vehicle longitudinal axis, along with cameras 954b positioned on the left and right sides of the vehicle 952 and oriented away from the longitudinal axis perpendicular to the vehicle longitudinal axis. The illustrated embodiment also includes a pair of cameras 954b positioned at or near the vehicle longitudinal axis and oriented to capture a forward looking field of view along a line of sight substantially parallel to the vehicle longitudinal axis.

In exemplary embodiments, the cameras 954b have angle of views, focal lengths, and other attributes that are different from those of one or more other cameras 954b. For example, the cameras 954b on the right and left sides of the vehicle may have an angle of view that is greater than the angle of view associated with the cameras 954b positioned at the front left, front right, rear left, or rear right of the vehicle. In some embodiments, the angle of view of the cameras 954b are chosen so that the field of view of different cameras 954b overlap, at least in part, to ensure camera coverage at particular locations or orientations relative to the vehicle 952.

The lidar devices 954c are also disposed at different locations of the vehicle 952, and in one embodiment, are disposed symmetrically about the longitudinal axis of the vehicle 952 to achieve parallax. Each of the lidar devices 954c may include or incorporate one or more lasers, scanning components, optical arrangements, photodetectors, and other components suitably configured to horizontally and rotatably scan the environment in the vicinity of the vehicle 952 with a particular angular frequency or rotational velocity. For example, in one embodiment, each lidar device 954c is configured to horizontally rotate and scan 360° at a frequency of 10 Hertz (Hz). As used herein, a lidar scan should be understood as referring to a single revolution of a lidar device 954c.

In exemplary embodiments described herein, the frequency or rate at which the cameras 954b capture images is greater than the angular frequency of the lidar devices 954c. For example, in one embodiment, the cameras 954b capture new image data corresponding to their respective field of view at a rate of 30 Hz. Thus, each camera 954b may capture multiple images per lidar scan, and capture the images at different times independent of the orientation of the lidar device 954c or the angular position within the scan. Accordingly, the subject matter described herein selects or otherwise identifies an image from each respective camera 954b that is temporally associated with the lidar point cloud data from a particular lidar scan based on the timestamps of the images captured by that respective camera 954b relative to a sampling time at which the angular position of the lidar scan corresponds to the line of sight of a lidar device 954c being aligned substantially parallel to the bisector (or line of sight) of the angle of view of the respective camera 954b.

The autonomous vehicle 952 uses the information from these different types of sensors to track the three-dimensional location and geometry of objects in the vicinity of the vehicle. In one exemplary embodiment, the autonomous vehicle 952 can generate or use such tracking for as three-dimensional locations of objects, distance/depth of the object from the vehicle, dimensions and shapes of the objects, velocity of the objects, etc. for use in determining a vehicle's path.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof

What is claimed is:

1. A method for generating a vehicle path to operate an autonomous vehicle, comprising:
    receiving, by one or more processors, data indicative of a vehicle path and data indicative of an initial position from a localization system for determining a lateral reentry error and a longitudinal reentry error;
    using, by the one or more processors, a lateral re-entry planner system for determining a trajectory subject to curvature and heading restraints for following the vehicle path based upon the lateral reentry error, to thereby generate a spatial plan using a first convex quadratic cost function;
    using, by the one or more processors, a longitudinal re-entry planner system for determining a trajectory subject to acceleration, velocity, and travel restraints for following the vehicle path based upon the longitudinal reentry error, to thereby generate a temporal plan using a second convex quadratic cost function;
    generating path correction commands based upon the determined trajectory of the lateral re-entry planner system and the determined trajectory of the longitudinal re-entry planner system, by fusing results from the spatial plan with results from the temporal plan, generating a series of points along a path of travel for the autonomous vehicle; and
    transmitting the generated path correction commands for controlling the autonomous vehicle.

2. The method of claim 1, wherein the determined trajectory of the lateral re-entry planner system and the determined trajectory of the longitudinal re-entry planner system are combined to generate a local plan for serving as a reference for control of the autonomous vehicle.

3. The method of claim 1, wherein the trajectory determined by the lateral re-entry planner system corrects for the lateral reentry error by solving for a path reentry plan for placing the autonomous vehicle on a correct path plan.

4. The method of claim 1, wherein the trajectory determined by the longitudinal re-entry planner system corrects for the longitudinal reentry error by solving for a path reentry plan for placing the autonomous vehicle on a correct path plan.

5. The method of claim 1, wherein the generated path correction commands are transmitted to control steering, braking, and engine components of the autonomous vehicle.

6. The method of claim 1, wherein the generating of the path correction commands comprises generating the path correction commands based upon the determined trajectory of the lateral re-entry planner system and the determined trajectory of the longitudinal re-entry planner system, by interpolating values of the spatial plan from the lateral re-entry planner system and the temporal plan from the longitudinal re-entry planner system at predetermined intervals of time and space.

7. The method of claim 1, wherein each point along the path is being associated with a time, x position, y position, velocity, acceleration, curvature, and heading, and creates a trajectory that is used as a reference for travel for the autonomous vehicle.

8. The method of claim 1, wherein the first convex quadratic cost function optimizes cost based on smoothness of travel.

9. The method of claim 1, wherein the first convex quadratic cost function utilizes cross track error (CTE) constraints, including avoidance of lane boundaries, turn radius, steering wheel velocity, and steering wheel acceleration using previous values from the longitudinal re-entry planner system.

10. The method of claim 1, wherein the first convex quadratic cost function utilizes a kinematic model with the following states: deviation from lane center; heading; curvature; and spatial jerk.

11. The method of claim 1, wherein the second convex quadratic cost function optimizes cost based on speed limits, acceleration limits, and jerk limits.

12. A system for generating a vehicle path to operate an autonomous vehicle, comprising:
    a storage device for storing instructions for generating the vehicle path; and
    one or more data processors configured to execute the instructions to:
    receive data indicative of a vehicle path and data indicative of an initial position from a localization system for determining a lateral reentry error and a longitudinal reentry error;
    use a lateral re-entry planner system for determining a trajectory subject to curvature and heading restraints for following the vehicle path based upon the lateral reentry error, to thereby generate a spatial plan using a first convex quadratic cost function;
    use a longitudinal re-entry planner system for determining trajectory subject to acceleration, velocity, and travel restraints for following the vehicle path based upon the longitudinal reentry error, to thereby generate a temporal plan using a second convex quadratic cost function;
    generate path correction commands based upon the determined trajectory of the lateral re-entry planner system and the determined trajectory of the longitudinal re-entry planner system, by fusing results from the spatial plan with results from the temporal plan, generating a series of points along a path of travel for the autonomous vehicle; and
    transmit the generated path correction commands for controlling the autonomous vehicle.

13. The system of claim 12, wherein the determined trajectory of the lateral re-entry planner system and the determined trajectory of the longitudinal re-entry planner system are combined to generate a local plan for serving as a reference for control of the autonomous vehicle.

14. The system of claim 12, wherein the trajectory determined by the lateral re-entry planner system corrects for the lateral reentry error by solving for a path reentry plan for placing the autonomous vehicle on a correct path plan.

15. The system of claim 12, wherein the trajectory determined by the longitudinal re-entry planner system corrects for the longitudinal reentry error by solving for a path reentry plan for placing the autonomous vehicle on a correct path plan.

16. The system of claim 12, wherein the generated path correction commands are transmitted to control steering, braking, and engine components of the autonomous vehicle.

17. An autonomous vehicle comprising:
- a camera and lidar sensor that provides sensor data; and
- a controller that, by a processor and based on the sensor data, is configured to:
- receive data indicative of a vehicle path and data indicative of an initial position from a localization system for determining a lateral reentry error and a longitudinal reentry error;
- use a lateral re-entry planner system for determining a trajectory subject to curvature and heading restraints for following the vehicle path based upon the lateral reentry error, to thereby generate a spatial plan using a first convex quadratic cost function;
- use a longitudinal re-entry planner system for determining trajectory subject to acceleration, velocity, and travel restraints for following the vehicle path based upon the longitudinal reentry error, to thereby generate a temporal plan using a second convex quadratic cost function;
- generate path correction commands based upon the determined trajectory of the lateral re-entry planner system and the determined trajectory of the longitudinal re-entry planner system, by fusing results from the spatial plan with results from the temporal plan, generating a series of points along a path of travel for the autonomous vehicle; and
- transmit the generated path correction commands for controlling the autonomous vehicle.

* * * * *